United States Patent [19]
Ziener

[11] 3,734,000
[45] May 22, 1973

[54] MEAT PROCESSING AND SEPARATING APPARATUS

[75] Inventor: Otto Ziener, Toronto, Ontario, Canada

[73] Assignees: Allan John Lackstone; Adele Handelman

[22] Filed: June 24, 1971

[21] Appl. No.: 156,182

[52] U.S. Cl. ............................99/539, 146/174
[51] Int. Cl. ...............................................B02b 7/04
[58] Field of Search ............................146/76 R, 174

[56] References Cited
UNITED STATES PATENTS

| | | | |
|---|---|---|---|
| 2,846,944 | 8/1958 | Willmes et al. | 146/76 R |
| 3,356,119 | 12/1967 | Kirkpatrick et al. | 146/174 |
| 3,396,768 | 8/1968 | Kurihara | 146/76 R X |
| 3,429,348 | 2/1969 | Hirtensteiner | 146/76 R |

Primary Examiner—Willie G. Abercrombie
Attorney—George A. Rolston

[57] ABSTRACT

This specification discloses an apparatus for separating edible products such as meat, flesh or fish from bone, carcasses and the like, having a rotary drum with a large number of small holes or perforations therethrough, driven at a predetermined speed and a pressure belt, one side of which is pressed firmly into contact with the drum and is adapted to move in the same direction as the drum, and having a series of pressure rolls forcing the belt into engagement with the drum at spaced points therearound, and adjustment means for tensioning the belt to the tension most suitable for the particular product being processed, and having scraper means for scraping the bone and cartilage residue and other material adhering to the exterior of the drum, and rammer means for ramming the carcasses between the moving belt and drum.

9 Claims, 8 Drawing Figures

Inventor
OTTO ZIENER
by: George A. Rolston

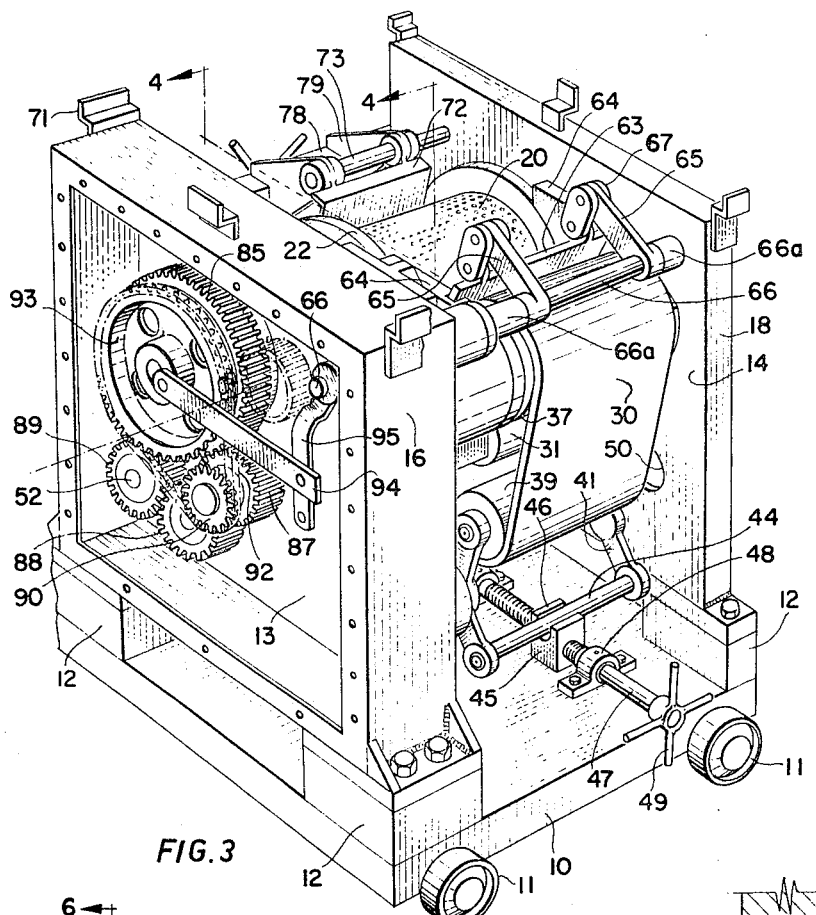
FIG.3
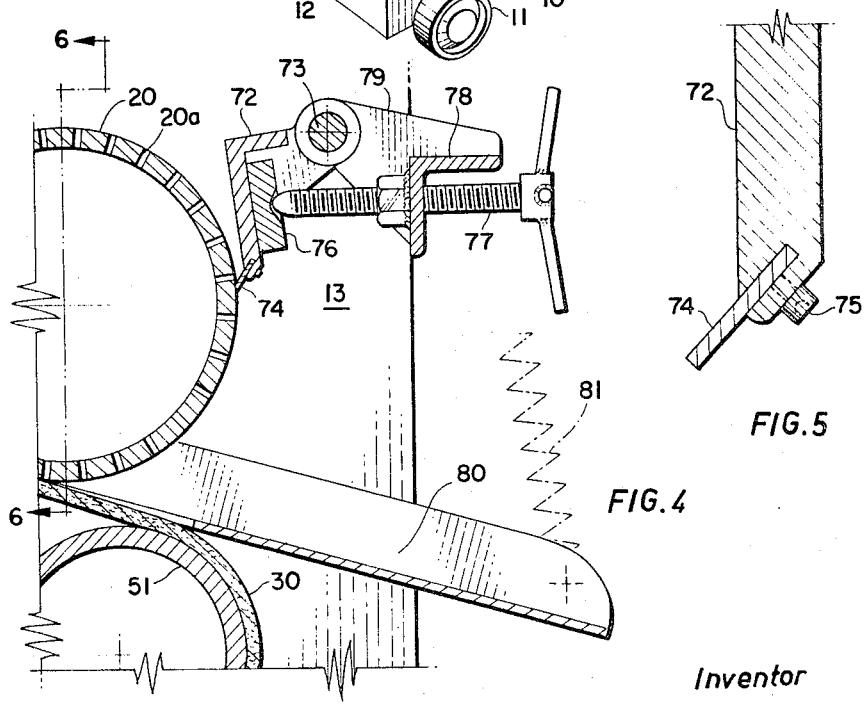
FIG.4
FIG.5
Inventor
OTTO ZIENER
by: George A. Rolston Inventor

OTTO ZIENER by: George A. Rolston

MEAT PROCESSING AND SEPARATING APPARATUS

The present invention relates to an apparatus for separating edible products from bone, such edible products including fish, poultry, meat and the like.

BACKGROUND OF THE INVENTION

Obviously, the majority of the meat or fish on a carcass will be removed by conventional techniques, and distributed for the table essentially in its original form, either as cuts of meat, or sections of poultry, or fillets of fish. However, a considerable quantity of meat or fish will be found to remain on the carcass and other bones which are not distributed as table cuts. In the past, attempts have been made to remove such residual meat and fish by hand in some cases, or, where this was too expensive, the entire carcass was simply ground up and then sold as bone meal. It has however long been recognized that disposal of such residual meat or fish in this way resulted in a great deal of waste. However, as manual labor costs increased, the cost of recovering such residual meat or fish increased and accordingly separating machines have been developed for the purpose.

Various machines have been proposed for separating meat and fish from bone, the end product usually being in the form of finely divided or pulped meat or fish, similar to meat or fish paste, which is then incorporated in limited quantities into certain limited kinds of food products such as meat paste, fish paste, pates, baby foods and similar food products. By the use of machines of this type, it has been found possible to eliminate a great deal of waste in the processing of meat and fish.

In the separation of such meat or fish from a carcass, every possible care must be taken to avoid inclusion of bone or animal cartilage in the meat or fish being removed. For example, in many countries regulations lay down very strict limitations on the amount of bone or cartilage which may appear in a meat or fish paste product. Accordingly, in the design of such machines, stringent precautions must be taken to avoid such inclusion. Generally speaking, in all such machines the carcass or other bones bearing the residual meat or fish are first of all crushed and pulverized prior to introducing the same into the separating machine. In the separating machine, it is conventional to pass the crushed carcasses between a belt or other moving flexible member, and a perforated drum, the perforations in the drum being small enough to restrict passage of bone therethrough but being such as to permit passage of particles of meat or fish into the drum.

Examples of such machines are shown in U.S. Letters Pat. Nos. 3,266,542 and 3,266,543, and 3,396,768. Such earlier known machines, as are described in the aforesaid letters patent, have all functioned more or less effectively, but in practice, upon analysis of the end product, are found to permit the inclusion of an excess of bone and cartilage particles, such that the product is unacceptable for human consumption as it stands. In fact, it is now common practice when employing such earlier machines, to run the product through the machine a second time, after which the percentage of included bone and cartilage is found to be sufficiently low as to be acceptable. Obviously, the reprocessing of the end product a second time substantially increases the production costs, and bearing in mind that the end product does not have a particularly high resale value, the operation of such machines can quickly become uneconomical.

In addition the end product was usually forced under substantial pressure through a final straining operation. These repeated operations had the effect of reducing the meat to a fine pulp or paste which was not acceptable for many products. Thus such a paste could not be used in hamburgers, ground meat, sausages, weiners or luncheon sausage for example because the paste lacked sufficient body or cohesion for such products.

It has always been assumed, in the design and manufacture of such machines that the bone and carcass must be substantially crushed and pulverized before it is introduced into the separating machine. Tests made recently now indicate that in fact the excessive crushing and pulverizing of the carcass and bone prior to introduction into the separating machine is unnecessary and in fact is undesirable.

Generally speaking, such prior art machines relied upon the fact that two different surfaces such as, a perforated drum and a belt, or a drum having a specially designed separating surface or the like, were moving essentially in the same direction, but at two different speeds. In this way, the pulverized portions of the carcass were subjected to a tearing or pulling action which, according to the theory of such machines, caused a separation of the meat from the remainder of the carcass, with the meat passing into holes or recesses in the drum. It is true that in these earlier types of machines a certain limited degree of pressure was applied so as to press the pulverized carcass against the drum, but, due to the very small particle size of the bone in the carcass, such pressure had to be quite severely restricted to prevent passage of bone particles through the drum.

According to the experiments conducted during the development of the present invention, it has now been established that provided the crushing and pulverizing of the carcass is substantially modified so that in fact the bones in the carcass are broken up only into relatively large pieces, then it is possible to greatly increase the pressure applied to the carcass by the belt as it passes around the drum, and a greatly increased degree of efficiency is achieved in the separation of the meat particles from the carcass in this way, without a corresponding increase in the passage of bone particles into the interior of the drum. In fact, according to the practice of the invention it is possible to produce a satisfactory end product having a bone content less than the prescribed minimum, after a single pass through the machine, or in any event with a substantial reduction in the processing time as compared with prior art machines.

Such improved results are also suprisingly achieved while at the same time the texture of the end product is greatly improved such that it can be used in higher percentages, up to 90 percent in some cases, in a wider variety of foods such as hamburgers, ground meat, sausages, weiners, luncheon sausage and fish cakes.

In addition, the design and construction of such prior art machines was of such a nature that they were often of unnecessarily complex construction, and required an excessive amount of time to be spent on maintenance and cleaning, and removal and replacement of the parts was unnecessarily complex. In addition, the overall efficiency of the machine in most cases was impaired by the tendency for pieces of bone and cartilage to become impacted on the outside of the drum, and simply continue to go around with the drum and clog it.

In addition, such prior art machines usually failed to provide for any suitable means for accurately tensioning the belt to the desired tension, bearing in mind differences between different types of animal meat and fish, which would normally require different settings for the most efficient processing.

BRIEF SUMMARY OF INVENTION

Applicant's invention therefore provides an apparatus for separating edible products from bone, carcasses and the like, having a rotary drum with a large number of small holes or perforations therethrough, driven at a predetermined speed and a pressure belt, one side of which is pressed firmly into contact with the drum and is adapted to move in the same direction as the drum, and having a series of pressure rolls forcing the belt into engagement with the drum at spaced points therearound, and adjustment means for tensioning the belt to the tension most suitable for the particular product being processed, and having scraper means for scraping the bone and cartilage residue and other material adhering to the exterior of the drum, and rammer means for ramming the carcasses between the moving belt and drum.

More particularly, the invention relates to an apparatus of the type described having the foregoing advantages in which the belt is provided with a tension release means for tensioning and releasing the belt, and a tension adjustment means separate from the tension release means, by means of which a predetermined tension on the belt can be preset.

More particularly, the invention relates to an apparatus of the type described having the foregoing advantages including adjustable scraper means for scraping the drum, and a readily replaceable scraper blade.

More particularly, the invention provides an apparatus of the type described having the foregoing advantages in which the drum is mounted within the apparatus in a readily releasable and removable manner for cleaning, and in which the belt and the associated pressure rolls and other moving parts are all readily either removable or accessible for cleaning and servicing.

More particularly, the invention provides an apparatus of the type described having the foregoing advantages in which drive means are provided for the drum and the belt and the rammer, all of such drive means being contained within a totally enclosed housing free from contamination by the product and designed for extended working life relatively free of maintenance.

The foregoing and other advantages will become apparent from the following description of a preferred embodiment of the invention which is given here by way of example only with reference to the following drawings in which like reference devices refer to like parts thereof throughout the various views and diagrams.

BRIEF DESCRIPTION OF DRAWINGS

FIG. 3 is an upper rear perspective illustration of the apparatus shown in FIGS. 1 and 2 with an upper tray portion of the apparatus removed for the sake of clarity;

FIG. 4 is an enlarged sectional side elevational view of the drum and scraper mechanism along the line 4—4 of FIG. 1;

FIG. 5 is a greatly enlarged section of the scraper bar and blade as shown in FIG. 4;

DETAILED DESCRIPTION OF PREFERRED EMBODIMENT

Figure 1:
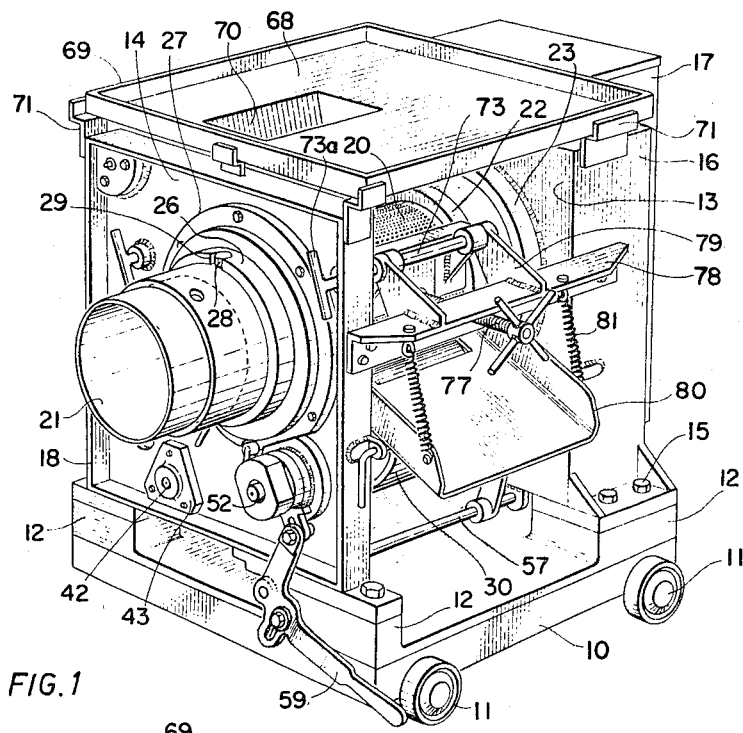
FIG. 1 is a perspective illustration of the separating apparatus, showing the drum partially withdrawn, and showing the belt tensioning mechanism in its released position.
Figure 2:
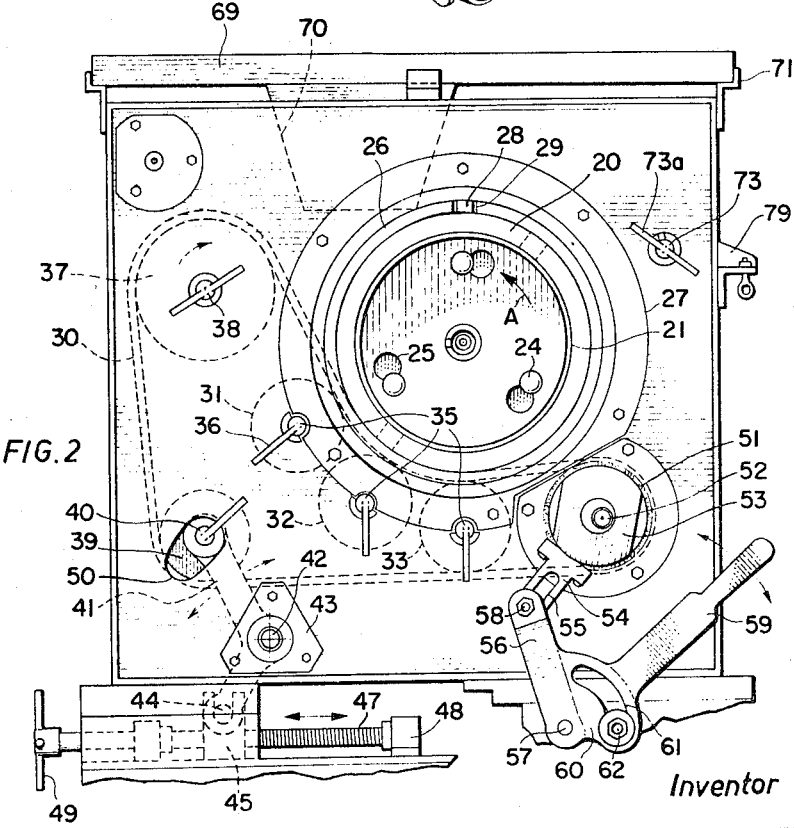
FIG. 2 is a side elevational view of the apparatus shown in FIG. 1, with the belt and pressure rolls shown in phanton, with the belt tensioning mechanism shown in position tensioning the belt.

Referring now to FIGS. 1, 2 and 3 it will be seen that this preferred embodiment of the invention consists of a base 10, of generally rectangular flat plate-like construction provided with any suitable stand means such as wheels 11 at its four corners, and support blocks 12 on the upper surface of the base 10 are provided to support the remainder of the apparatus clear of base 10 thereby leaving a clear space underneath for cleaning and maintenance. Mounted directly on the block members 12, are two side wall panels 13 and 14 upon which the remainder of the apparatus is mounted. Walls 13 and 14 are preferably secured to the blocks 12 as by bolts 15 of any other suitable means. The side panel 13 will be seen to be associated with a generally rectangular box-like housing member 16, which contains the drive mechanism (described below) and a further box-like housing unit 17 will be seen to be attached to the exterior of housing 16 which can contain power operated means such as for example an electrical motor, and a reduction gear box or the like (described below).

The side wall 14 is simply provided with peripheral flanges 18 extending therearound for greater strength, being otherwise exposed on both sides as shown.

The separator drum 20 will be seen to be a large cylindrical stainless steel member with a large number of small perforations or holes 20a made therein of a size suitable to permit passage of small particles of meat or fish to pass therethrough, while rejecting particles of bone or cartilage. Drum 20 is rotatably supported and connected so that it may be driven at a predetermined speed of rotation in the direction of the arrow A in FIG. 2. The drum 20 will be seen to be of a sufficient length to extend across the space defined between side walls 13 and 14, and substantially beyond the exterior or outer side of side wall 14 so as to deliver separated meat particles within the drum clear of the exterior of the apparatus. In order to provide for still further extension, an inner sliding extension collar 21 is provided which merely makes a tight sliding fit with the interior of the drum 20, and may be adjusted in and out so as to provide for delivery of such separated meat products in the most advantageous manner. The drum 20 is supported in the side wall 13 by means of the rotating hub member 22, supported in the collar 23 welded to the interior of the wall 13 as shown. Rotating hub 22 is driven by the drive mechanism located within the drive housing 16 (described below), and to provide for positive drive drum 20 is secured within the rotatable drive bearing 22 by means of three drive lugs 24, fitting within key hole shaped slots 25, by a semi-rotary locking movement of the drum 20 relative thereto. At its other end, the drum 20 is supported in the rotatable bearing member 26, rotatably mounted in the mounting ring 27 fastened to the side wall 14. Bearing 26 is keyed together with drum 20 by means of the key member 28 fastened to the drum 20, and fitting in the slot 29 in the bearing 26.

In this way, the drum 20 is rotatably mounted in the side walls 13 and 14, and is fully supported for continuous heavy duty operation, and is yet nevertheless readily releasable and removable for cleaning whenever required.

In order to press the carcasses firmly against the drum 20, and to force the meat particles through the openings therein, the belt 30 is provided, formed of a synthetic rubber-like compound, and preferably supported on a suitable fabric web or the like in accordance with well known techniques. The belt 30 must be of very considerable strength and wide enough to engage substantially the whole width of the drum 20, across the space defined between the two bearings 22 and 26.

In order to support the belt 30, there is provided a train of six belt rollers, around which the belt is arranged all of which are arranged to be removable from the belt 30 so that the belt 30 can be removed and replaced or cleaned as often as is necessary. The train of six rollers comprise the three pressure rollers 31, 32 and 33, arranged between the side walls 13 and 14, and supported on the releasable spindles 35 provided with handle 36 by which the same may be rotated and removed. The details of the fastening release mechanism for the spindle 35 are not shown, but may comprise any means such as threaded means or the like so as to ensure that the spindle 35 may be readily removed to permit release of the rolls 31, 32 and 33 for cleaning. It will be noted that the rolls 31, 32 and 33 are so spaced in relation to the drum 20 that they define a spacing therebetween more or less equal to the thickness of the belt 30, whereby to maintain the belt 30 in close contact with the outer surface of the drum 20, at least when in registration with rolls 31, 32 and 33.

An upper idler roll 37 is the uppermost of the rolls, and defines the highest part of the belt 30. Roll 37 is mounted on spindle 38 which is releasably fastenable by any suitable means such as threaded means, or the like (not shown) so as to hold the roll 37 in position between the side walls 13 and 14 as shown.

A lower idler tension roll 39 is provided on the return portion of the belt 30, ie. the portion of the belt 30 which is out of contact with the drum 20. The tension idler roll 39 is mounted on the spindle 40, which is not fastened to either of side walls 13 or 14, but instead is mounted between upper ends of the two bell cranks 41, which are provided with an intermediate pivot 42, each end of which is fastened as at bearing plate 43 between side walls 13 and 14. The other ends of the two bell cranks 41 are joined together by means of a cross shaft 44 (see FIG. 3) and the cross shaft 44 is itself engaged and grasped by the trunnion member 45 provided with a U-shaped groove 46 for the purpose, and being threadably mounted on the threaded jack screw 47 rotatably mounted in the bearings 48. By means of handle 49, jack screw 47 may be rotated, causing the trunnion 45 to run to and fro thereby swinging the bell cranks 41 and causing the tension idler roll 39 to move to and fro.

In order to have access to the releasable spindle 40 of the roll 39, a slotted opening 50 is provided in the side wall 14, which thereby permits the spindle 40 to extend through the side wall 14, and at the same time permits the tension idler roll 39 to be swung to and fro.

The last remaining roll in the train of rolls of the belt 30 is the belt drive and tension roll 51. The drive and tension roll 51 is arranged so that it is both driven by means of the drive mechanism contained within the drive housing 16, and is at the same time movable to and fro between tensioning and release positions so as to permit tensioning and release of the belt 30. By this means, it is possible to both tension and release the belt 30 without altering the adjustment of the jack screw 47. Thus by means of trial and error the position of the jack screw for a particular type of meat or fish can be selected, after which it will be left unchanged. However every time the belt 30 and the other mechanism must be removed for cleaning, all that is required is to release the tension roll 51 thereby permitting the disassembly of the apparatus.

In order to provide this double function, the drive and tension roll 51 is mounted on a drive spindle 52, by means of which it is positively driven during operation, through the drive train mechanism to be described below and contained within the drive housing 16. At each end of the spindle 52, that is to say at both side walls 13 and 14, the spindle 52 is itself mounted in eccentric hub bearings 53 and 53a rotatably mounted in respective side walls 14 and 13 only the hub 53 in wall 14 being shown in detail. The eccentric hubs 53 and 53a are provided with control arms 54 having a slotted opening 55 therein, by means of which the eccentric hubs 53 and 53a may be swung to and fro. Swinging movement of the arms 54 is effected by means of the lever member 56, pivotally mounted on the support member 12 by means of cross shaft 57, and a free end of lever 56 being slidably connected to the arm 54 by means of the bolt 58. An operating arm 59 is connected by the plate 60 to the lever 56, by means of which the lever 56 may be swung to and fro. Preferably, the plate 60 is provided with the slotted opening 61, and a fixed bolt 62 also connected to the support member 12 extends through the slotted opening 61 to establish two positions of movement namely a belt release position and a belt tension position. It will of course be understood, as noted above, that the other eccentric hub bearing 53a is provided on the opposite end of the spindle 52, in side wall 13 and is rotated in essentially the same manner as the hub 53, by means of a corresponding lever mechanism (not shown) operated by means of the cross shaft 57 and operating arm 59.

Figure 7:
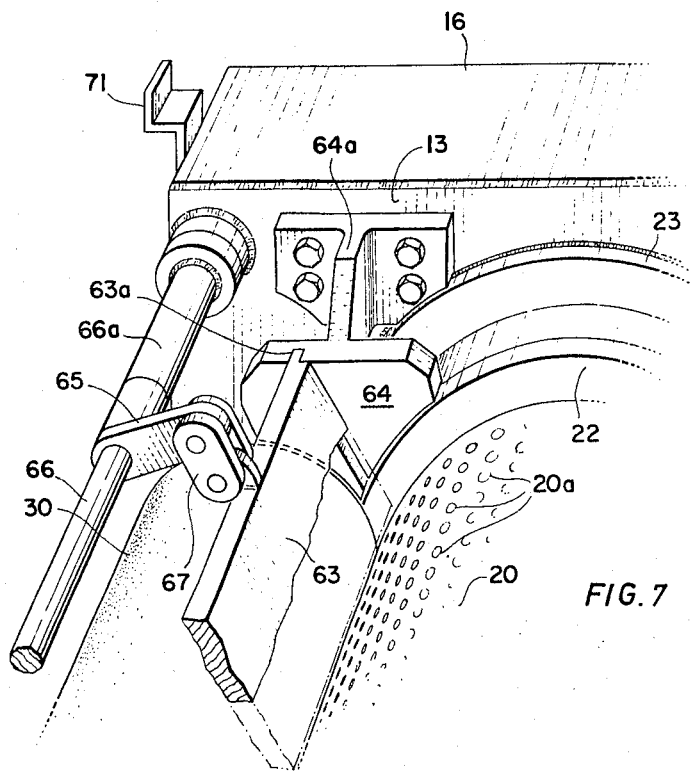
FIG. 7 is a perspective illustration of the rammer mechanism according to the invention, partially cut away to reveal its construction, and, FIG. 8 is a perspective illustration of the power operated means and reduction drive within housing 17 which is cut away to reveal its interior.

In order to force the carcasses and bones between the belt 30 and the drum 20, a rammer mechanism is provided consisting of the rammer plate 63, slidable to and fro in the grooves 63a in plates 64, and operated in a sliding motion therein by means of the two operating arms 65 mounted on the drive shaft 66. Plates 64 are fastened to side walls 13 and 14 by mounting brackets 64a as shown in FIG. 7. Preferably, swingable connecting links 67 are provided between the arms 65 and the plate 63 so as to permit relative movement therebetween.

The drive shaft 66 is preferably journalled in sleeves 66a at each end, and extends through the side wall 13 into the interior of the drive housing 16. By means of the drive mechanism to be described below, the drive shaft 66 is preferably rotated to and fro through a limited arc, thereby swinging the arms 65 upwardly and downwardly and causing a reciprocating sliding movement of the rammer plate 63 upwardly and downwardly.

In order to feed carcasses and bones to the rammer plate 63 and the belt 30, there is provided a sheet metal tray 68, having side walls 69 and a feed chute 70, oriented to deliver carcasses and bones directly to nip between the drum 20 and the belt 30 in the area of the lower end of the rammer 63. Preferably, a plurality of support brackets 71 are provided on side walls 13 and 14 as shown to support the tray 68 in position.

In order to clean off the drum 20 as it rotates, to ensure the removal of bone and cartilage particles which are too large to enter the openings 20A in the drum 20, drum scraper means are provided shown in greater detail in FIGS. 4 and 5. The drum scraper means will be seen to comprise a scraper bar 72 swingably mounted on the spindle 73. The spindle 73 is releasably fastened in support arms 79 and extends through side wall 14. Handle 73a is attached to spindle 73 for releasing the same. The scraper bar 72 is of relatively rigid massive construction and is provided with a replaceable scraper blade 74 releasably held therein by means of set screws 75. A pressure pad 76 is provided on the rear of the scraper bar 72.

The scraper blade 74 is oriented to extend from the scraper bar 72 into engagement with the drum 20. The scraper blade 74 may be pressed to a greater or lesser degree against the drum 20 by means of an adjustable jack screw 77, rotatably carried in the fixed bracket 78 fastened across the side walls 14 and 13 as shown, and engaging pressure pad 76. Support brackets 79 are welded or fastened to bracket 78 for supporting spindle 73 as described above.

In order to permit efficient delivery of the rejected bone, cartilage and other matter from the exterior of the drum 20, a waste chute 80 is swingably mounted between the side walls 13 and 14, and is held in any suitable position by means of the springs 81. Preferably the chute 80 is oriented downwardly, just below the location of the scraper blade 74 so that material scraped off the drum by means of the blade 74 will fall onto the chute 80 and slide downwardly therefrom into any suitable waste container (not shown).

Figure 8:
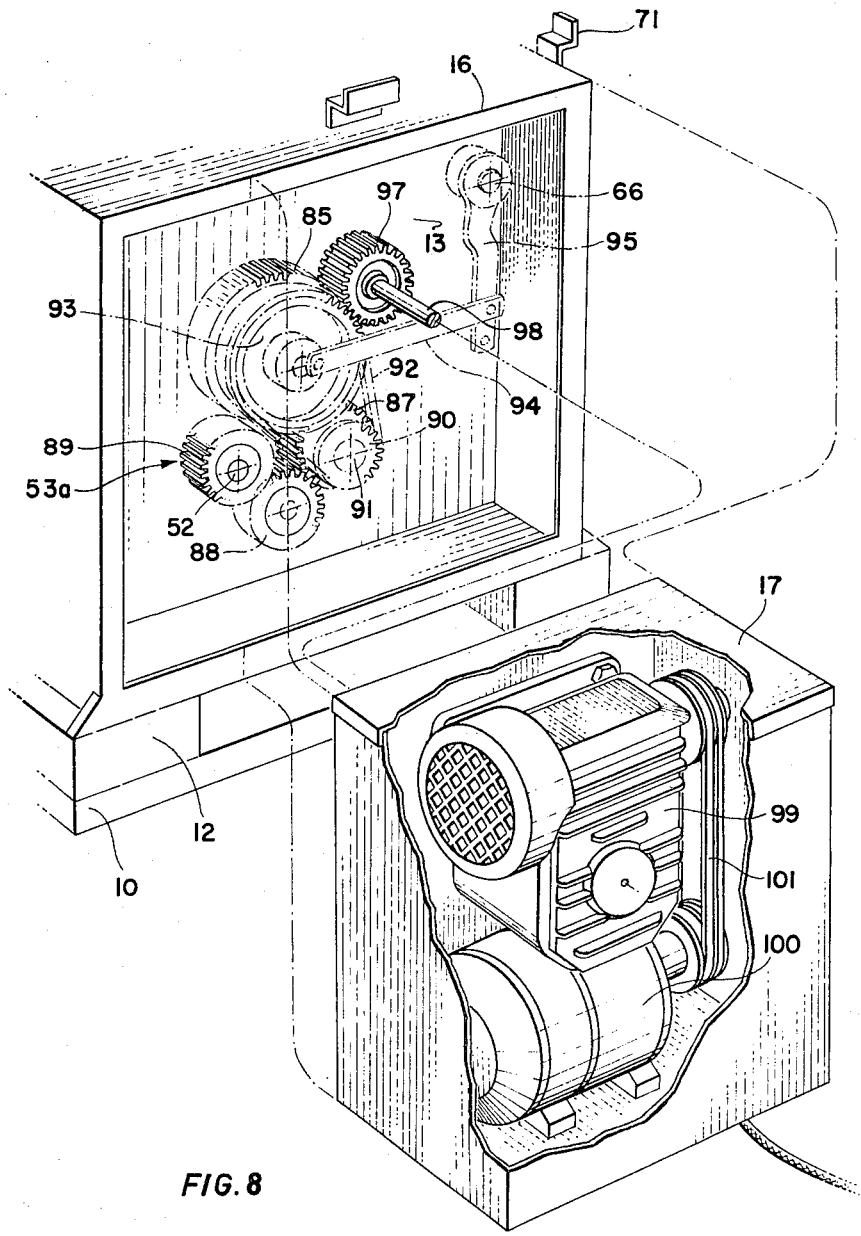

In order to drive the various movable elements described above, the drive housing 16 contains a drive system, shown most clearly in FIG. 8. This drive system is designed to provide a drive for the drum 20, and a drive for the belt 30, and a drive for the rammer 63. Obviously, the drum 20 and the belt 30 are required to move in opposite directions, ie. the one operates clockwise and the other counter-clockwise, so that where the drum 20 and the belt 30 are in contact with one another, they are both in fact moving in the same direction. Preferably, according to the invention provision is made for one such member to move either slightly faster or slightly slower than the other so as to produce a certain degree of relative movement between the carcasses or bone and the drum 20. In addition, the rammer 63 must be operated, by means of a semi-rotary movement of the drive shaft 66. Obviously, it is desirable that all of these different movements should be produced by a single power source. As stated, such a drive system is shown in FIG. 8, essentially contained within the drive housing 16, the housing 17 being shown removed from the drive housing 16 for the sake of clarity.

Thus in order to drive the drum 20, a drum drive gear 85 is fastened to the drive hub 22 by means such as the bolts 86 (see FIG. 6) whereby rotation of gear 85 will rotate hub 22 and thereby drive drum 20.

In order to drive belt 30, the gear 87 is rotatably mounted on side wall 13, and meshes with gear 85. Gear 87 meshes with an idler gear 88 rotatably mounted on side wall 13, and gear 88 meshes with gear 89 mounted on the eccentric hub bearing 53a and driving the spindle 52. Thus rotation of the drum drive gear 85 in a clockwise direction will rotate the gear 87 anticlockwise which will in turn rotate the idler gear 88 in a clockwise direction which in turn rotate the belt drive gear 89 in an anti-clockwise direction.

It will of course be understood that the eccentric hub 53a, as described above in connection with FIGS. 1 and 2, is essentially a mirror image of the eccentric hub 53, the details of which are omitted for the sake of clarity. Preferably, however, the movement of the eccentric hubs 53 and 53a is arranged to be as closely as possible in an arc centered more or less on the center of the idler gear 88. In this way, as the spindle 52 is moved from one position to another by rotation of the hubs 53 and 53a, the meshing between the gears 88 and 89 will not alter to any substantial extent. Obviously, unless the diameter of the eccentric hubs 53 is very great, it will not be possible to arrange that movement of the spindle 52 and gear 89 take place around an arc of a circle centered on the axis of idler gear 88, and in fact in practice, a certain limited degree of movement between gears 88 and 89 will take place, although as stated by the aforesaid arrangement, it is intended that such movement should be minimized.

Figure 6:
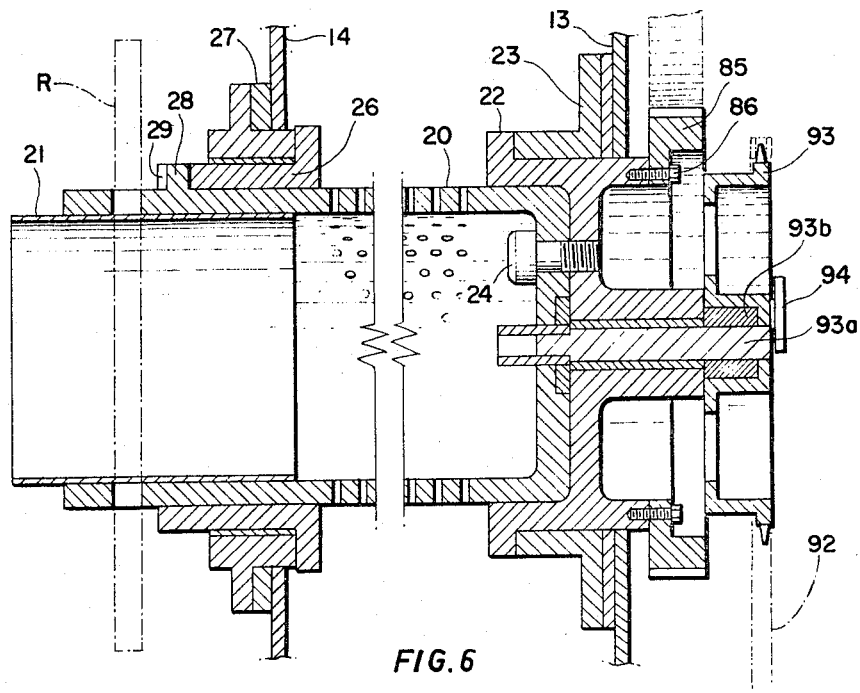
FIG. 6 is an enlarged sectional end elevational view of the drum and drive mechanism along the line 6—6 of FIG. 1.

In order to drive the drive shaft 66 in a semi-rotary movement, the chain drive sprocket 90 is attached by means of the drive shaft 91 to the gear 87, and rotates in unison therewith. A drive chain 92, driven by sprocket 90, engages the driven sprocket 93, and rotates the same. The driven sprocket 93, as best shown in FIG. 6, is freely rotatably mounted on the spindle 93a by means of the bushing 93b. Thus, as the drum drive gear rotates in a clockwise direction, thereby driving the gear 87 in an anti-clockwise direction, the sprocket 90 will similarly rotate in an anti-clockwise direction, and the driven sprocket 93 will also rotate in an anti-clockwise direction. Thus, the drum drive gear 85 and the driven sprocket 93 in fact rotate in opposite directions. A connecting rod 94 is pivotally mounted on an inner portion of the driven sprocket 93, and at the free end thereof, connecting rod 94 is fastened to the drive arm 95. The drive arm 95 is itself keyed to the drive shaft 66, whereby swinging movement of the drive arm 95 to and fro will procure a semi-rotary movement of the drive shaft 66.

Power is supplied to the whole system by means of the power drive gear 97, which meshes with the drum drive gear 85. A drive shaft 98 is connected to the reduction gear box 99 located in the housing 17, and the reduction gear 99 is powered by means of the electric motor 100, through the medium of the drive belts 101.

In operation, power is supplied through the power drive gear 97, thereby rotating the drum drive gear 85 clockwise, which thereby rotates the belt drive gear 89 anti-clockwise, thereby procuring movement of the periphery of the drum 20, and the portion of the belt 30 in contact therewith in the same direction, and due to differences in the sizes of the gears, in fact belt 30 will move somewhat faster than the drum 20 in the desired manner. At the same time, rotation of the drum drive gear 85 in a clockwise direction will rotate the gear 87 anti-clockwise, which will in turn rotate the drive sprocket 90 anti-clockwise, thereby rotating the driven sprocket 93 anti-clockwise. Rotation of the sprocket 93 will in turn cause forward and backward reciprocal movement of the connecting rod 94, causing swinging movement of the arm 95 and semi-rotary movement of the drive shaft 66. Semi-rotary movement of the drive shaft 66 will cause upward and downward reciprocal movement of the rammer 63. This describes the manner of continuous operation of the apparatus. Once the apparatus is set in motion as described above, then carcasses or bones bearing scraps or residual portions of meat or flesh or fish and the like are then fed into the hopper 70, and pass directly downwardly therethrough into the region of the nip between the belt 30 and the drum 20. The rammer 63 reciprocating upwardly and downwardly forces the carcasses and bones into such nip, and they are then progressively passed around the drum 20, the belt 30 moving somewhat faster, than the drum 20, and forcing the carcasses and bones to roll around, thereby ensuring substantially complete removal of all the meat or flesh thereon.

Particles of meat of flesh pass through the openings 20a in the drum 20. As the drum 20 continues to rotate, the meat particles contained therein will roll towards the extension member 21, and eventually be ejected therefrom into any suitable container or receptacle (not shown) for further processing.

Rejected particles of bone, cartilage and the like which do not pass through the openings 20a, will drop off the drum 20 onto the chute 80, and pass to any other suitable receptacle (not shown). Any residual particles of bone or cartilage which remain adhered to the drum 20 are scraped off by means of the action of the scraper blade 74 from whence they will fall onto the chute 80 to be disposed of as described above.

In the event that the separation of the meat from the bone is not achieved in a satisfactory manner, ie. either too little meat is passing into the drum 20 or too much in the way of bone particles is passing into the drum 20, then the tension of the belt 30 can be adjusted by means of rotation of the jack screw 47, until the best setting is achieved. Once this setting is achieved, then the machine will be left as it is, so long as essentially the same raw material is being supplied to the machine. On every occasion, such as each evening at least, when the machine must be stripped and cleaned, then the tension on the belt is released simply by swinging the handle 59 downwardly thereby rotating the eccentric hub 53, and causing the spindle 52 to move slightly rearwardly. This slight degree of movement is generally sufficient to relieve the tension on the belt 30 afterwhich the spindle 35 and 38 and 40 can all be removed, and the spindle 52 can be withdrawn thereby leaving the belt 30 free from the machine so that it may be cleaned. Similarly, the drum 20 may be removed simply by passing a rod R (shown in phantom in FIG. 6) through suitable openings in the end of the drum 20, and by means of the rod R the drum 20 is then rotated so as to release the studs 24 from the key hole openings 25, afterwhich it may be withdrawn and cleaned. With these various members removed from the machine, the whole machine can be thoroughly cleaned and sterilized and made ready for use the next morning. Once assembled, the belt is tensioned by swinging the handle 59 upwardly again. It is not necessary to readjust the jack screw 47, which can be left in its previous setting, and processing can proceed as before.

The foregoing is a description of a preferred embodiment of the invention which is given here by way of example only. It is not intended to limit the invention to any specific features as described, but the invention is deemed to comprise all variations which come within the scope of the appended claims.

What I claim is:

1. Apparatus for separating edible products such as flesh from bone, carcasses and the like, said apparatus comprising;

mounting frame means defining two sides spaced apart from one another;

separator drum means rotatably mounted between said two sides, and having a plurality of separator holes formed therein for passage of said edible products therethrough under pressure;

continuous belt means, of a width substantially equal to said perforated portion of said drum, a portion of said belt contacting and engaging the exterior of a portion of said drum and forming a nip therewith;

pressure roll means engaging said belt at spaced points on said portion thereof in contact with said drum urging said belt into engagement with said drum;

drive roll means for said belt, engaging and driving the same;

adjustable tension roll means for said belt engaging the same and operable to adjustably tension the same;

rammer means mounted for reciprocal movement between said mounting frame means, and reciprocably slidable towards and away from said drum and belt, and operable to force said bone and the like directly into the nip therebetween;

scraper means mounted between said mounting frame means, and engaging said drum in an area remote from said belt;

feed chute means located above and to one side of said drum, and oriented to direct said bone and the like between said drum and said belt, and, drive means for driving said drum, and said belt, and said rammer as aforesaid.

2. Apparatus as claimed in claim 1 wherein said separator drum means is closed at one end, and is open at the other, and including slot means in said closed end, for releasable interengagement with said drive means for said drum, and including a slidable drum extension member at said open end, operable to extend the length of said drum for delivery of product from the interior thereof.

3. Apparatus as claimed in claim 1 including rotatable bearing means in said sides for receiving said drum therein, and means for interlocking said drum with at least one said bearing whereby said drum and said bearing rotate in unison with one another to avoid wear on said drum.

4. Apparatus as claimed in claim 1 including means adjustably supporting said drive roll means, for movement into and out of belt tensioning and release positions, and means for moving said drive roll means between said two positions, without disturbing said adjustable tension roll means.

5. Apparatus as claimed in claim 1 wherein said adjustable tension roll means includes roll means in engagement with said belt, swingable mounting means mounting said roll means, for swinging engagement between belt tensioning and belt loosening positions and manually operable control means for swinging said roll means between said two positions and locking the same in any desired position of adjustment.

6. Apparatus as claimed in claim 1 including rammer guide means mounted on said two sides of said mounting frame means, rammer plate means reciprocably slidable in said guide means towards and away from said nip of said drum and belt, connecting arm means connected to said rammer plate means, and drive shaft means operably connected to said connecting arm means, whereby to procure reciprocable operation of said rammer plate means as aforesaid.

7. Apparatus as claimed in claim 1 wherein said scraper means comprises scraper bar means, support means attached between said sides swingably mounting said scraper bar means for swinging movement towards and away from said drum, and releasable scraper blade means attached to said scraper bar means, and manually operable control means for adjusting and holding said scraper bar means with said blade in engagement with said drum means.

8. Apparatus as claimed in claim 1 wherein said drive means for driving said belt includes belt drive gear means keyed to said belt drive roll means, intermediate gear means driving said belt drive gear means, and bearing means mounting said drive roll means and said belt drive gear means, for movement between two positions, said belt drive gear means and said intermediate gear means remaining meshed together in driving engagement in both positions.

9. Apparatus as claimed in claim 1 including drive gear means for driving said drum, operable in one direction, and drive means operatively interconnected with said rammer means, and being mounted concentrically with said drum drive gear means, and operable to rotate in the opposite direction thereto.

* * * * *